United States Patent [19]

Schmitt

[11] Patent Number: 5,389,041
[45] Date of Patent: Feb. 14, 1995

[54] RIGID DISC DRIVE UNIVERSAL LINK

[75] Inventor: Werner H. Schmitt, Falls Church, Va.

[73] Assignee: Hoppmann Corporation, Chantilly, Va.

[21] Appl. No.: 999,361

[22] Filed: Dec. 31, 1992

[51] Int. Cl.[6] .............................................. F16D 3/16
[52] U.S. Cl. ..................................... 464/106; 464/147; 464/185; 494/52
[58] Field of Search ............... 464/106, 112, 113, 114, 464/185, 147; 494/52, 55, 67

[56] References Cited

U.S. PATENT DOCUMENTS

| | | | |
|---|---|---|---|
| 1,625,511 | 4/1927 | Ungerer | 464/106 |
| 1,872,039 | 8/1932 | James | 464/113 |
| 2,504,197 | 8/1950 | Hunick | 464/112 |
| 4,429,808 | 2/1984 | Doty . | |
| 4,457,738 | 7/1984 | Gross et al. | 464/147 X |
| 4,560,368 | 12/1985 | Sherman, II et al. | 464/147 X |
| 5,073,145 | 12/1991 | Ratzokwski et al. | 464/106 X |
| 5,163,877 | 11/1992 | Marpet et al. | 464/112 X |

FOREIGN PATENT DOCUMENTS 8505418 12/1985 WIPO .............................. 464/106

Primary Examiner—Daniel P. Stodola
Assistant Examiner—Eileen A. Dunn

[57] ABSTRACT

A drive connection joint for transmitting rotary motion from a drive shaft to a movable member includes a movable link having a first end and a second end. The first end of the movable link being pivotally connected to a drive shaft. A connector affixed to a movable member. A slot is formed in the connector, the slot includes a predetermined length, width and depth. The movable link is accommodated within the slot to permit axial movement within the depth of the slot and lateral movement along the length of the slot for permitting a three-way connection between a drive shaft and a movable member, namely, pivotable movement, axial movement and lateral movement.

10 Claims, 1 Drawing Sheet

RIGID DISC DRIVE UNIVERSAL LINK

BACKGROUND OF THE INVENTION

1. Field of the Invention

The present invention is directed to a drive connection joint for transmitting rotary motion from a drive shaft to a movable member.

2. Description of the Background Art

Hithertofore, universal joints provide a two-way connection between a drive shaft and a movable member. More specifically, the connection provides for limited pivotal motion between the two elements and limited sliding motion relative to the two elements. However, the normal two-way universal joint connection does not permit the necessary degrees of motion required to accommodate a three-way motion between the elements.

Centrifugal feeders are designed to utilize a rotating center disc for delivering articles from a feeder bowl onto a rim of the bowl to facilitate orientation and feeding of articles at high and low rates of feed.

A problem is encountered in the conventional arrangement of the drive mechanism for the center disc. Presently, two methods are utilized for rotating the center disc at a predetermined speed relative to the rotational speed of the feeder bowl. First, two independent drives are provided. One drive is operatively connected to the feeder bowl for imparting rotation thereto at a first predetermined speed. In addition, a second drive is operatively connected to the center disc for rotating the center disc relative to the feeder bowl at a second predetermined speed.

A second method utilizes a central drive shaft which only utilizes one drive. A complex arrangement of a stationary ramp, flexible discs and anti-friction medium of either a lubricating powder or a plastic liner disc are provided which act as a bearing medium.

Both methods described hereinabove have drawbacks. The two drive unit is complicated and expensive. The flexible disc method is also complicated and expensive and induces a factor of friction between the rubber flexible disc and the stationary ramp. The frictional factor changes over time and must be overcome during the operation of the centrifugal feeder. This can cause changes in the feeding performance over the life cycle of the centrifugal feeder.

SUMMARY AND OBJECTS OF THE PRESENT INVENTION

It is an object of the present invention to provide a single drive mechanism which may be utilized to provide rotary motion to both a drive shaft and a movable member.

Another object of the present invention is to provide a drive connection joint which permits a three-way connection between a drive shaft and a movable member, namely, pivotal movement, axial movement and lateral movement.

A further object of the present invention is to provide a drive connection joint within a centrifugal feeding machine wherein a drive shaft is provided which is operatively connected to a movable link for providing transmission from the drive shaft to a center disc.

These and other objects of the present invention are achieved by providing a drive connection joint for transmitting rotary motion from a drive shaft to a movable member. A movable link is provided having a first end and a second end. The first end of the movable link is adapted to be pivotally connected to a drive shaft. A connector is provided. The connector is adapted to be affixed to a movable member. A slot is formed in the connector wherein the slot has a predetermined length, width and depth. The movable link is accommodated within the slot to permit axial movement within the depth of the slot and lateral movement along the length of the slot for permitting a three-way connection between the drive shaft and a movable member, namely, pivotal movement, axial movement and lateral movement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figures 1, 2:
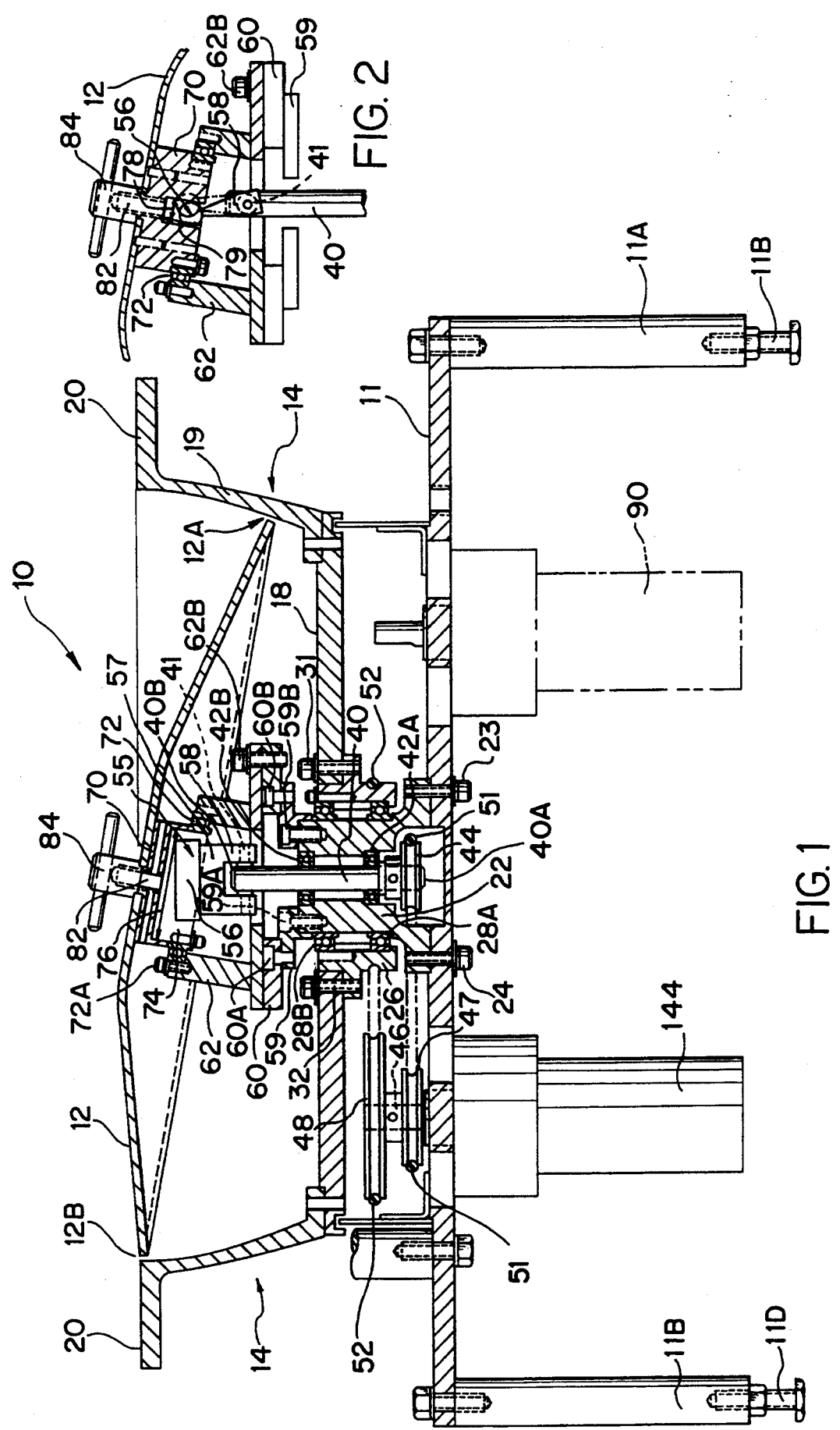
FIG. 1 is a side elevational view illustrating the drive connection joint operatively assembled within a centrifugal feeder according to the present invention.
FIG. 2 is an enlarged view of the drive connection joint rotated at 90° relative to the view illustrated in FIG. 1.

As illustrated in FIGS. 1 and 2, a centrifugal feeder 10 includes a housing base 11. The housing base 11 is operatively positioned relative to a floor surface by means of leg members 11A, 11B. The leg member 11A includes an adjustable foot support 11C for adjusting the leg 11A relative to the ground surface. Similarly, the leg 11B includes a foot support 11D which is adjustable to adjusting the leg 11B relative to the ground surface.

A rotating center disc 12 is operatively positioned within a feeder bowl 14. The feeder bowl 14 includes a bottom surface 18, upwardly projecting sidewalls 19 and a rim 20. The bottom surface 18 is mounted for rotation relative to the housing base 11.

As illustrated in FIG. 1, a spindle mounting 22 is secured to the housing base 11 by means of bolts 23, 24. The bottom member 18 of the feeder bowl 14 includes an inner bearing member 26 which is mounted to the spindle 22 by means of bearings 28A, 28B. The bearing member 26 is secured to the bottom member 18 by means of bolts 31, 32.

The central drive shaft 40 is operatively disposed within the spindle 22. The central drive shaft 40 is mounted by means of bearings 42A, 42B relative to the spindle 22 to permit rotation relative thereto. A pulley member 44 is affixed to an end portion 40A of the central drive shaft 40.

A single motor 144 may be provided with a drive shaft 46 for providing rotational motion to both the central drive shaft 40 and the rotating center disc 12.

The output shaft 46 includes a pulley 47 with a predetermined diameter affixed relative thereto. A second pulley 48 is mounted to the output shaft 46. The second pulley 48 has a second predetermined diameter relative thereto. The first pulley 47 is secured to the pulley 44 by means of a belt 51. Similarly, the second pulley 48 is secured to the bearing member 26 by means of a belt 52. In view of the difference in diameter of the pulley 47 relative to the pulley 48, the rotary motion supplied to the central drive shaft 40 and subsequently to the rotating center disc 12 will be at a higher speed relative to the rotary motion supplied from the pulley 48 to the bearing 26 and thus the feeder bowl 14.

A movable link 55 is secured to one end 40B of the central drive shaft 40 by means of a pivot pin 41. As illustrated in FIGS. 1 and 2, the movable link 55 includes a cylindrical rod member 56 positioned at one end thereof. A central portion 57 is disposed between the cylindrical rod 56 and a first end 58 of the movable link 55. The central portion 57 is a wedge-shaped member increasing in width from the cylindrical rod member 56 to the first end 58.

As illustrated in FIG. 1, a base adjusting support 59 is affixed to the spindle 22 by means of bolts 59A, 59B. In addition, an extension support 60 is secured to the support 59 by means of bolts 60A, 60B. A mounting support 62 is secured to the extension support 60 by means of bolts 62B. The bolts 62B are positioned within enlarged openings in the mounting support 62 so as to adjust the positioning of the mounting support 62 relative to the extension support 60. A connector 70 is mounted relative to the mounting support 62 by means of a bearing 72. The bearing 72 is secured relative to the mounting support 62 by means of a bolt 72A. The connector 70 includes a slot 74 disposed therein. The slot 74 has a predetermined length 76, a predetermined width 78 and a predetermined depth 79.

As illustrated in FIGS. 1 and 2, the movable link 55 is disposed within the slot 74 of the connector 70. In this way, the cylindrical rod member 56 may move along the length 76 of the slot 74. In addition, the cylindrical rod member 56 may move axially along the height 79 of the slot 74. Further, in view of the fact that the movable link 55 is pivotally mounted relative to the central drive shaft 40, the movable link 55 is provided with three degrees of movement relative to the central drive shaft 40.

The connector 70 includes a pin 82 projecting upwardly therefrom. A rotating center disc 12 may be secured to the pin 82 by means of a bolt 84. In this way, the positioning of the rotating center disc 12 relative to the connector 70 may be accurately positioned.

As illustrated in FIG. 1, the rotating center disc 12 includes one side 12A which extends within the feeder bowl 14. The other side 12B is aligned to be tangential to the rim 20 on the opposite side of the feeder bowl 14. A plurality of bolts secure the mounting support 62 relative to the extension support 60. In FIG. 1, only bolt 62B is illustrated. However, a number of bolts may be provided to ensure the positioning of the mounting support 62 relative to the extension support 60. By adjusting the bolt 62B, the mounting support 62 may be realigned relative to the extension support 60. In this way, the particular position of the rotating disc 12 relative to the rim 20 may be changed. In addition, by rotating the rotating center disc 12 to another position and readjusting the movable link 55, the point of tangential intersection of the rotating disc 12 relative to the rim 20 may be changed. This feature of the present invention may be important when the delivery of articles deposited to the feeder bowl 14 which are desired to be qualified or sorted on the rim 20 is changed to require a different takeoff of the articles to the final production line.

As illustrated in FIGS. 1 and 2, the central drive shaft 40 is securely retained within the spindle 22 by means of the bearings 42A, 42B. The rotation of the central drive shaft 40 by means of the pulley 44, belt 51 and pulley 47 is fixed in a predetermined disposition. In addition, the bearing member 26 is secured relative to the bottom 18 of the feeder bowl 14. The bearing member 26 is securely positioned relative to the spindle 22 by means of the bearings 28A, 28B. The rotation supplied to the bearing member 26 by means of the belt 52 and the pulley 48 is securely aligned in a predetermined disposition.

The rotating center disc 12 is disposed within the feeder bowl 14 at a predetermined angle. The angle of the rotating center disc 12 places the center line of the pin 82 at a predetermined angle relative to the center line of the central drive shaft 40. In view of the non-alignment of the center line of the pin 82 and the rotating disc 12 relative to the central drive shaft 40, a normal connection between the central drive shaft 40 and the rotating disc 12 is not acceptable. In other words, a normal universal joint would not accommodate the three necessary motions needed in order to accommodate the various changes in the disposition of the movable link 55 as the rotating disc 12 rotates relative to the rotation of the feeder bowl 14.

The present invention accounts for the misalignment of the center line of the pin 82 and the rotating center disc 12 relative to the center line of the central drive shaft 40. In view of this misalignment, the movable link 55 can pivot about the pivot pin 86 which secures the movable link 55 relative to the central drive shaft 40. Thus, the movable link 55 can pivot relative to the central shaft about the pivot pin 86. In addition, the second end of the movable link which may include a cylindrical rod 56 may axially extend within the height 79 of the slot 74. In addition, the second end of the movable link 55 which may include the cylindrical rod 56 may slide along the length 76 of the slot 74.

The present invention permits a three-way connection between the central drive shaft 40 and the rotating center disc 12. This three-way connection is important in order to accommodate the various motions necessary to adapt to the fact that the center line of the central drive shaft 40 is offset relative to the center line of the rotating center disc 12.

As illustrated in FIG. 1, a second motor 90 may be provided in order to supply rotary motion to either the central drive shaft 40 or the bearing member 26. In other words, during very specialized applications of the centrifugal feeder 10, it may be necessary, in certain arrangements, to provide two motors in order to rotate the feeder bowl 14 at a predetermined speed relative to the speed of the rotating center disc 12. It is not anticipated that a second motor 90 is necessary for all applications of the present invention. However, a second motor may be provided if necessary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A drive connection joint for a centrifugal feeding machine comprising:

a drive shaft having a first end and a second end, said drive shaft being operative positioned within said housing for rotation;

a movable link having a first end and a second end, said first end of said movable link being pivotally connected to said drive shaft;

a feeder bowl including a bowl portion, an upwardly projecting sidewall and a rim affixed to said upwardly projecting sidewall, said feeder bowl being rotatably mounted relative to said housing;

a center disc operatively positioned for rotation and being selectively adjustably positioned within said bowl, said center disc including an axis of rotation being positioned at an angle relative to a center line of said drive shaft and being adapted to be mounted at an angle within said bowl for supplying articles disposed within said bowl upwardly to said rim; and a connector, said connector being affixed to said center disc, a slot formed in said connector, said slot having a predetermined length, width and depth, said movable link having a length being less than the predetermined length of the slot and being accommodated within said slot to permit axial movement within the depth of said slot and lateral movement along the length of said slot for permitting a three-way connection between said drive shaft and said center disc, namely, pivotable movement, axial movement and lateral movement and said connector being selectively adjustably mounted relative to said drive shaft for adjusting the positioning of said center disc affixed thereto relative to said bowl.

2. The drive connection joint according to claim 1, wherein said second end of said movable link includes a cylindrical rod member affixed thereto for being received within said slot in said connector, said cylindrical rod being axially movable within the depth of the slot and laterally movable along the length of the slot.

3. The drive connection joint according to claim 2, wherein said movable link includes a central portion connected between said first end and said cylindrical rod member, said central portion being a wedge shaped member increasing in width from said cylindrical rod member to said first end of said movable link.

4. The drive connection joint according to claim 1, wherein a center line of said drive shaft is offset relative to a center line of said movable link.

5. The drive connection joint according to claim 1, wherein said first end of said movable link includes an opening adapted to accommodate said drive shaft and a pivot pin operative provided for insertion within a thickness of said first end and through a portion of said drive shaft for providing a pivotal connection therebetween.

6. The drive connection joint according to claim 1, wherein adjusting the position of said connector relative to said drive shaft will adjust the point of discharge of articles to said rim.

7. A drive connection joint for a centrifugal feeding machine comprising:

a housing;

a drive shaft having a first end and a second end, said drive shaft being operative positioned within said housing for rotation;

a movable link having a first end and a second end, said first end of said movable link being pivotally connected to said drive shaft;

a feeder bowl including a bowl portion, an upwardly projecting sidewall and a rim affixed to said upwardly projecting sidewall, said feeder bowl being rotatably mounted relative to said housing;

a center disc operatively positioned for rotation and being selectively adjustably positioned within said bowl, said center disc including an axis of rotation being positioned at an angle relative to a center line of said drive shaft and being adapted to be mounted at an angle within said bowl for supplying articles disposed within said bowl upwardly to said rim; and a connector, said connector being affixed to said center disc, a slot formed in said connector, said slot having a predetermined length, width and depth, said second end of said movable link includes a cylindrical rod member affixed thereto for being received within said slot in said connector, said cylindrical rod being axially movable within the depth of the slot and laterally movable along the length of said slot for permitting a three-way connection between said drive shaft and said center disc, namely, pivotable movement, axial movement and lateral movement, said movable link includes a central portion connected between said first end and said cylindrical rod member, said central portion being a wedge shaped member increasing in width from said cylindrical rod member to said first end of said movable link and said connector being selectively adjustably mounted relative to said drive shaft for adjusting the positioning of said center disc affixed thereto relative to said bowl.

8. The drive connection joint according to claim 7, wherein a center line of said drive shaft is offset relative to a center line of said movable link.

9. The drive connection joint according to claim 7, wherein said first end of said movable link includes an opening adapted to accommodate said drive shaft and a pivot pin operative provided for insertion within a thickness of said first end and through a portion of said drive shaft for providing a pivotal connection therebetween.

10. The drive connection joint according to claim 7, wherein adjusting the position of said connector relative to said drive shaft will adjust the point of discharge of articles to said rim.

* * * * *